Feb. 26, 1952 — R. SACHTLEBER — 2,587,067
VEHICLE JACK
Filed Sept. 28, 1948
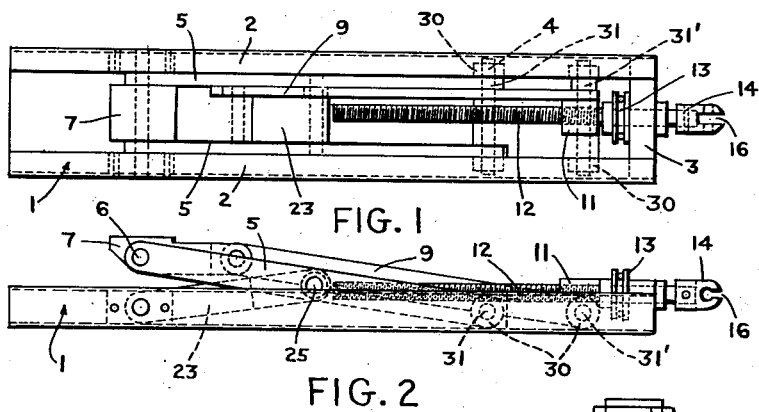
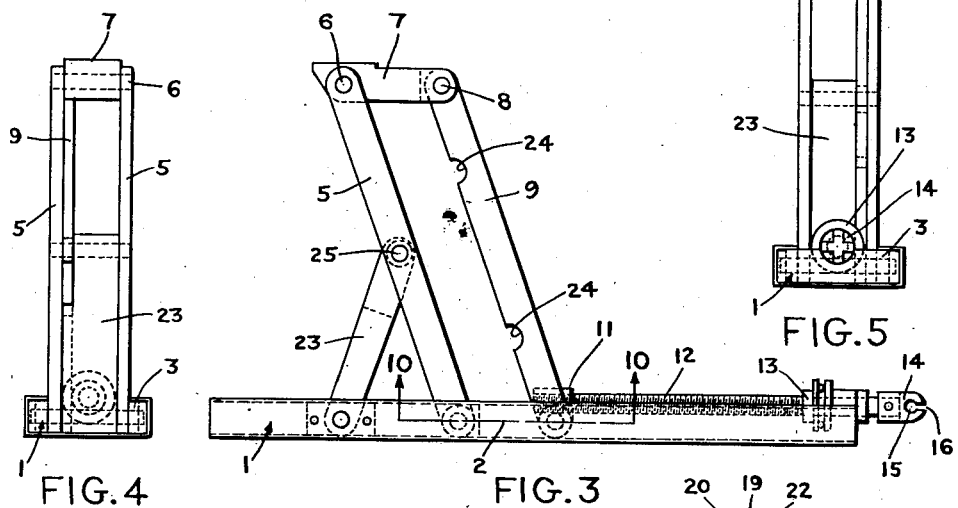
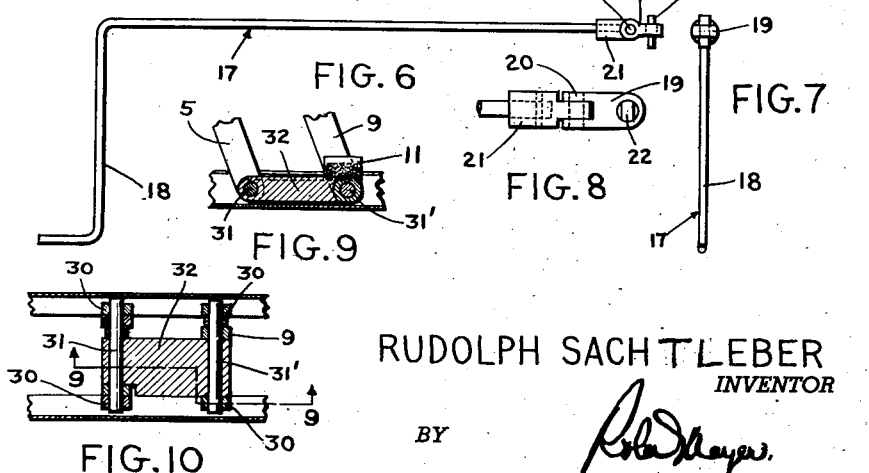
RUDOLPH SACHTLEBER
INVENTOR
BY
ATTORNEY Patented Feb. 26, 1952

2,587,067

UNITED STATES PATENT OFFICE 2,587,067

VEHICLE JACK

Rudolph Sachtleber, East Orange, N. J.

Application September 28, 1948, Serial No. 51,513

5 Claims. (Cl. 254—126)

This invention relates to jacks, particularly adaptable for use in raising automobiles or other vehicles, and an object of the present invention is to provide an improved jack which is simple in construction, powerful, and may be operated with minimum effort to lift a vehicle.

Another object of the present invention is to provide a vehicle jack which when in collapsed position is quite flat and may easily be placed beneath a spring, axle, or other suitable part of a vehicle for applying the lifting force at a point adjacent to a flat tire and thereby obtain the maximum lifting action at the point desired.

Another object of the invention is to provide a vehicle lifting jack which will not slip when supporting a vehicle in raised position, and one which may be operated to raise or lower a vehicle, from a standing position of the operator.

With these and other objects in view, as may appear from the accompanying specification, the invention consists of various features of construction and combination of parts, which will be first described in connection with the accompanying drawings, showing a vehicle jack of a preferred form embodying the invention, and the features forming the invention will be specifically pointed out in the claims.

In the drawings:

Figure 1 is a top plan of the improved jack.

Figure 2 is a side elevation of the jack showing it in collapsed position.

Figure 3 is a side elevation of the jack showing it in raised position.

Figure 4 is an end elevation of the jack showing it in raised position.

Figure 5 is an end view of the jack showing the end opposite to that shown in Figure 4.

Figure 6 is a view of a crank handle employed for operating the jack.

Figure 7 is an end view of the jack operating handle.

Figure 8 is a plan view of a part of the jack operating handle.

Figure 9 is a fragmentary vertical section through the improved jack taken on line 9—9 of Figure 10.

Figure 10 is a fragmentary horizontal section taken on the line 10—10 of Figure 3.

Referring more particularly to the drawings, the improved jack comprises a base 1 which includes a pair of parallel side bars 2 connected by cross bars 3. The side bars 2 are substantially U-shaped in cross section as is shown in Figures 4 and 5 of the drawings and they form trackways for a plurality of rollers 30. The rollers 30 are mounted on axles 31 and 31' which extend through a carrier block 32, as clearly shown in Figures 9 and 10 of the drawings. A lifting supporting structure is pivotally connected to the axle 31 as shown in Figures 9 and 10 of the drawings and the supporting structure comprises a pair of parallel lifting supporting levers 5. The free ends, that is, the ends opposite to those pivotally connected to the carrier block 32 by the axle 31, are pivotally connected as shown at 6 to a load supporting seat plate 7. The load supporting seat plate 7 is also pivotally connected as shown at 8 to a brace bar 9. The brace bar 9 has its end opposite to the pivot 8 mounted on the axle 31'. The carrier 32 has a projection 11 formed thereon which is internally threaded to form a feed nut.

A feed or operating screw 12 is rotatably carried by a suitable thrust collar 13 supported by the base 1 and is threadably engaged in the nut 11. The feed or operating screw 12 has a connecting clutch head 14 mounted on its end outwardly of the end of the base frame 1. The coupling head 14 is provided with a pair of diametrically extending openings 15 which open out through the end of the coupling head through restricted slots 16. An operating handle 17 is employed in connection with the jack which includes the crank 18 and the pivotally connected coupling element 19. The coupling 19 is pivotally connected as shown at 20 to a suitable head 21 carried by the operating handle 17. The coupling element 19 has a flattened pin 22 carried thereby which projects laterally from the sides of the coupling element as clearly shown in Figure 6 of the drawings.

In operation, the flattened pin 22 is slipped through the restricted slot 16 until it is engaged in the transverse opening 15 in the coupling element 14 and then by rotating the crank handle the operating screw 12 will be fed through the nut 11 which will move the carrier 32 along the tracks formed by the side bars 2 for raising or lowering the lifting supporting levers 5 and load supporting seat plate 7. A bracing lever 23 is pivotally connected for raising or lowering the lifting supporting levers 5 and load supporting seat plate 7. A bracing lever 23 is pivotally connected to the base 1 and to the lifting levers 5 intermediate their ends. As shown in Figures 1, 4, and 5 of the drawings, the bracing lever 23 extends the full distance between the two lifting supporting levers. As shown at 24, the brace bar 9 is notched so that when the jack is in its collapsed position, as shown in Figure 2 of the drawings, the notches will engage over the pivot 4 of the supporting levers 5 and over the pivot 25 of the bracing lever 23 so as to permit the jack to be collapsed to a maximum flatness.

It will be understood that the invention is not to be limited to the specific construction or arrangement of parts shown, but that they may be widely modified within the invention defined by the claims.

What is claimed is:

1. A lifting jack comprising a base, a carrier, rollers on said carrier and engaging said base, a pair of parallel lifting supporting levers pivotally connected to said carrier, a load seat plate pivotally connected to the free ends of the lifting levers, a bracing lever pivotally connected to said supporting levers intermediate their ends and pivotally connected to said base, a feed nut carried by said carrier, a feed screw rotatably carried by said base and engaging said feed nut for moving said carrier along the base to raise or lower said supporting lifting levers, and a brace bar having one end pivotally connected to said carrier and disposed to move with said carrier in the horizontal line of said base and the other end pivotally connected to said load seat plate.

2. A lifting jack comprising a base, a carrier, rollers on said carrier and engaging said base, a pair of parallel lifting supporting levers pivotally connected to said carrier, a load seat plate pivotally connected to the free ends of the lifting levers, a bracing lever pivotally connected to said supporting levers intermediate their ends and pivotally connected to said base, a feed nut carried by said carrier, a feed screw rotatably carried by said base and engaging said feed nut for moving said carrier along the base to raise or lower said supporting lifting levers, and a brace bar having one end pivotally connected to said carrier and disposed to move with said carrier in the horizontal line of said base and the other end pivotally connected to said load seat plate, a socket member carried by said operating screw, an operating handle, a coupling member for cooperation with said socket pivotally connected to one end of said operating handle.

3. A lifting jack comprising a base, a carrier, rollers on said carrier and engaging said base, a pair of parallel lifting supporting levers pivotally connected to said carrier, a load seat plate pivotally connected to the free ends of the lifting levers, a bracing lever pivotally connected to said supporting levers intermediate their ends and pivotally connected to said base, a feed nut carried by said carrier, a feed screw rotatably carried by said base and engaging said feed nut for moving said carrier along the base to raise or lower said supporting lifting levers, and a brace bar having one end pivotally connected to said carrier and disposed to move with said carrier in the horizontal line of said base and the other end pivotally connected to said load seat plate, said bracing lever being of a width equal to the space between said parallel lifting supporting levers.

4. A lifting jack comprising a base having channeled side members, a carrier, axles carried by said carrier, a plurality of rollers rotatably mounted on said axles and rotatably engaging said channel side bars, a pair of lifting supporting levers pivotally mounted on one of said axles, a load seat plate pivotally connected to the ends of said levers remote from said axle, a brace bar pivotally connected to the other of said axles and having its end remote from the axle pivotally connected to said load seat plate, a lifting brace pivotally connected to said lifting levers intermediate their ends and having its end oppositely to that connected to the lifting levers pivotally connected to said base, a feed nut on said carrier, a thrust collar carried by said base, a feed screw extending through said thrust collar and threaded into said feed nut for moving the carrier along said side bars to raise or lower the lifting levers and load seat plate upon rotary movement of the feed screw.

5. A lifting jack comprising a base, a carrier, rollers on said carrier and engaging said base, a feed nut mounted at one end of said carrier, a pair of parallel lifting supporting levers pivotally connected to the other end of said carrier a spaced distance outwardly of said feed nut, a load seat plate pivotally connected to the free ends of the lifting levers, a bracing lever pivotally connected to said lifting supporting levers intermediate their ends and pivotally connected to said base, a feed screw rotatably carried by said base and engaging said feed nut whereby when said feed screw is turned said carrier will move along the base and raise or lower said lifting supporting levers, and a brace bar having one end pivotally connected to said carrier and disposed to move with said carrier in the horizontal line of said base and the other end pivotally connected to said load seat plate for maintaining said load seat plate in a substantially horizontal plane.

RUDOLPH SACHTLEBER.

REFERENCES CITED

The following references are of record in the file of this patent:

UNITED STATES PATENTS

| Number | Name | Date |
|---|---|---|
| 2,147,837 | Gottman | Feb. 21, 1939 |
| 2,469,048 | Manke | May 3, 1949 |

FOREIGN PATENTS

| Number | Country | Date |
|---|---|---|
| 342,093 | Great Britain | Jan. 29, 1931 |